United States Patent [19]

Hoppe

[11] Patent Number: 4,896,231
[45] Date of Patent: Jan. 23, 1990

[54] BACKBONE GASKET FOR DISC DRIVES
[75] Inventor: Robert F. Hoppe, Santa Cruz, Calif.
[73] Assignee: Seagate Technology, Inc., Scotts Valley, Calif.
[21] Appl. No.: 220,509
[22] Filed: Jul. 18, 1988
[51] Int. Cl.$^4$ ............................................. G11B 5/012
[52] U.S. Cl. ................................................ 360/97.02
[58] Field of Search ........................... 360/97.02, 97.04
[56] References Cited
U.S. PATENT DOCUMENTS
4,725,904  2/1988  Dalziel .............................. 360/97.02

Primary Examiner—A. J. Heinz
Attorney, Agent, or Firm—Flehr, Hohbach, Test, Albritton & Herbert

[57] ABSTRACT

An improved gasket for a disc drive system having magnetic information storage media located within a sealed housing. The housing includes top and bottom casing members that are clamped together with the gasket disposed therebetween to seal the drive. The gasket includes a stiffener layer sandwiched by a pair of foam layers.

1 Claim, 4 Drawing Sheets

BACKBONE GASKET FOR DISC DRIVES

The present invention relates generally to an improved gasket construction for sealing and damping vibrations within a magnetic disc drive casing.

BACKGROUND OF THE INVENTION

Disc drive machines record and reproduce information stored on magnetic media. Conventional Winchester type disc drives include a plurality of vertically aligned rotating information storage discs journaled about a spindle motor assembly within a housing. The magnetic discs each have at least one associated magnetic head that is adapted to transfer information between the disc and an external system. Each head is carried by an elongated flexure arm. The flexure arms are vertically aligned and are each attached to a common head positioner assembly. The head positioner assembly is adapted to move the heads back and forth in unison across the face of the vertically aligned discs. The head positioner assembly may be either rotationally mounted, or may take the form of a linear carriage that is free to move back and forth along a single axis. In either case, the head positioner assembly is adapted to rapidly and precisely position the heads relative to the magnetic discs. Rapid movements of the various components, including the spindle motor, the head positioner assembly and the discs tend to generate a wide variety of undesirable vibrations within the disc drive.

The housing is typically divided into upper and lower casings which are sealed together with a gasket to prevent the introduction of dirty air into the disc drive. The gasket also serves to dampen vibrations within the housing. Conventional gaskets suffer two primary drawbacks. Initially, gaskets that are thick enough to provide good damping characteristics tend to bulge outward when compressed between the upper and lower casing. Additionally, conventional gaskets lack any structural rigidity and thus are difficult to position on the casing for production. The extra time spent accurately positioning the gasket in the middle of the production line increases both the time and the costs involved in producing disc drives.

SUMMARY OF THE INVENTION

Accordingly, it is a primary objective of the present invention to provide a gasket for disc drives that has sufficient rigidity so that will retain its shape when handled at one end.

Another objective is to provide a gasket for disc drives that provides good damping and does not bulge substantially under compression.

To achieve the foregoing and other objects and in accordance with the purpose of the present invention, a backbone gasket is provided for a disc drive system having magnetic information storage media located within a sealed housing. The housing includes top and bottom casing members that are clamped together with the gasket disposed therebetween to seal the drive. The gasket includes a very thin stiffener layer sandwiched by a pair of substantially thicker foam layers.

The stiffener layer is formed of a relatively stiff material having a relatively low modulus of elasticity and good shearing properties. The foam layers are chosen to good vibration damping characteristics. In a preferred embodiment, the stiffener layer is formed of VALOX.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
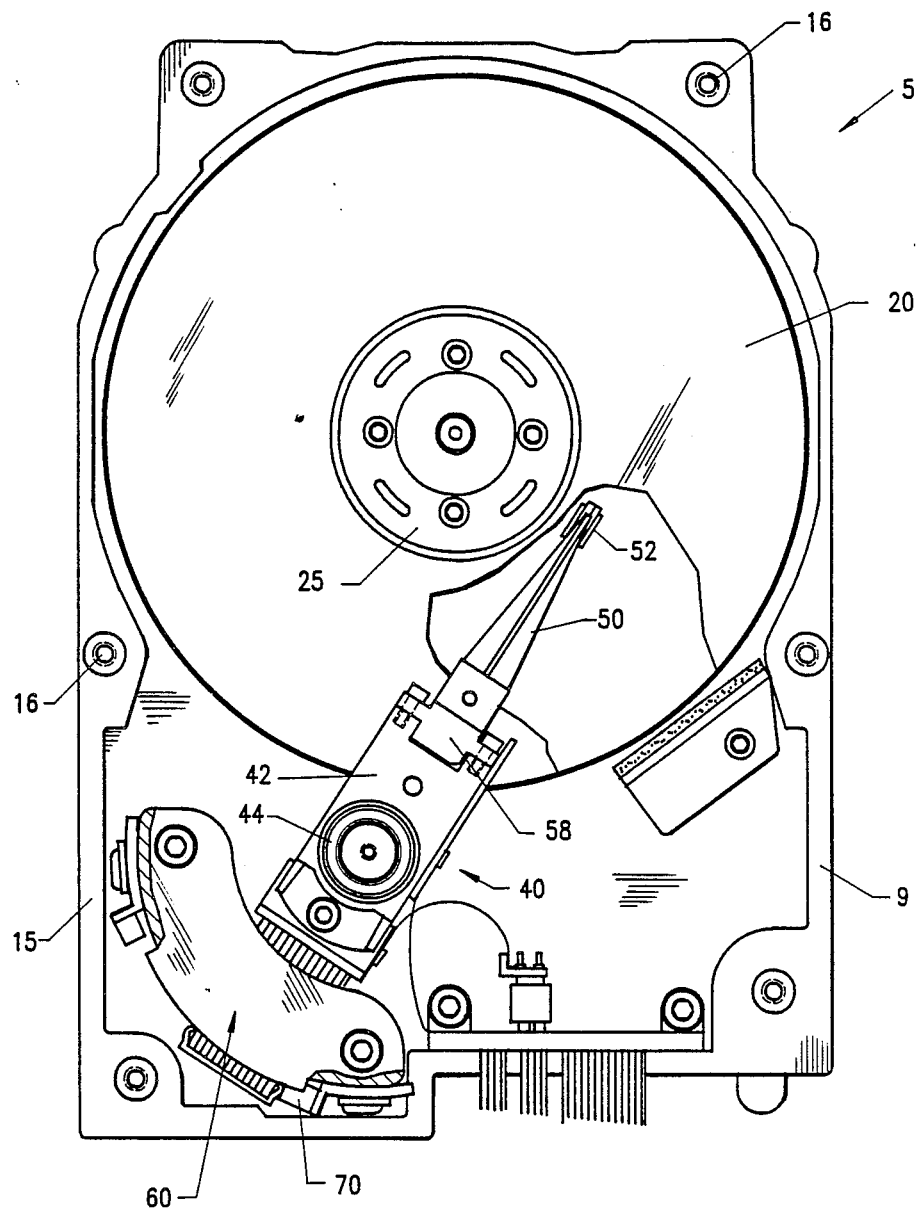
FIG. 1 is a diagrammatic top view of a disc drive that incorporates the present invention with its upper casing removed.

As illustrated in the drawings, a disc drive constructed in accordance with the present invention includes a housing 5 having upper and lower casing members 7 & 9 respectively. A backbone gasket 11 is disposed between the top and bottom casing members to provide an air tight seal and to provide some damping for vibrations within the housing.

Figure 2:
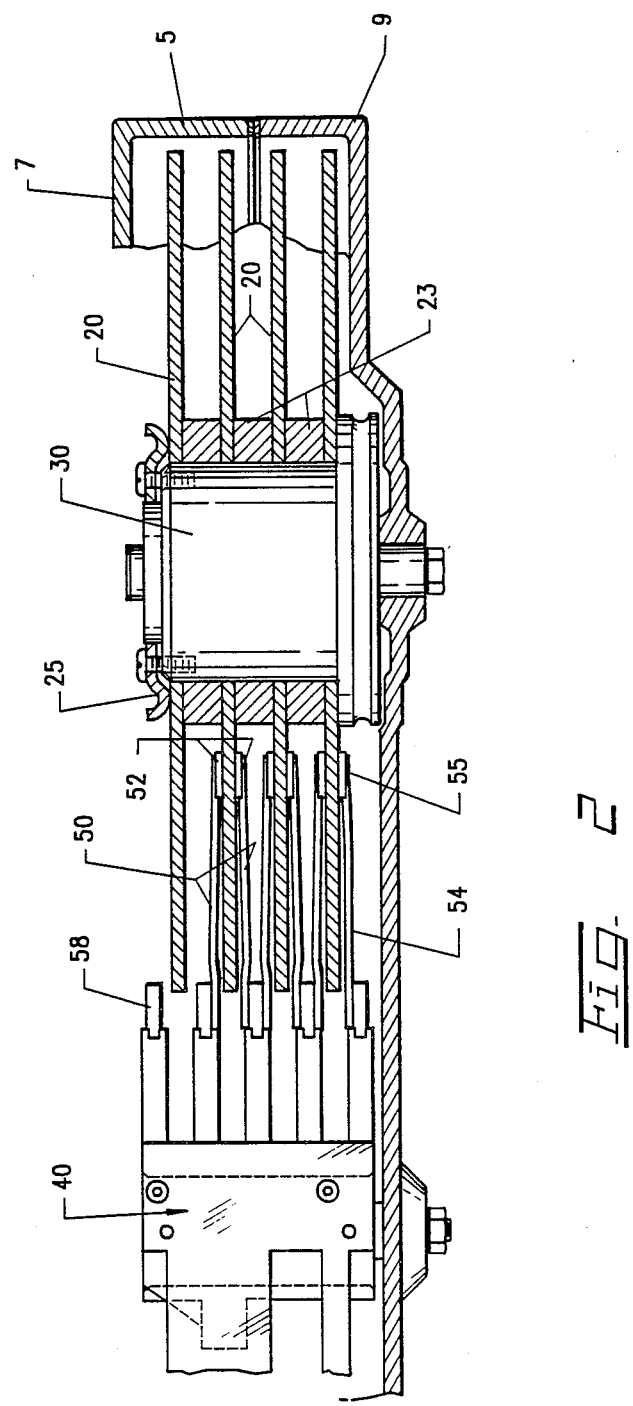
FIG. 2 is a diagrammatic side view of the disc drive shown in FIG. 1

Referring first to FIGS. 1 & 2, a disc drive system suitable for incorporating the teaching of the present invention is shown in diagrammatic form. A plurality of information carrying magnetic discs 20 are journaled about spindle motor assembly 30 within a housing 5 having upper and lower casing members 7 & 9 respectively. Each magnetic disc 20 has a multiplicity of concentric information storage tracks for recording information. A head positioner assembly 40 is rotatably mounted between the upper and lower casings 7,9 in one corner of the housing 5. The head positioner assembly 40 carries a plurality of flexure arms 50 that each carry a magnetic data head 52 for reading information from and writing information onto the magnetic discs 20. The head positioner assembly 40 also carries a servo arm 54 which carries a servo head 55 for accurately positioning the data heads 52 relative to the information storage tracks 22. A voice coil motor 60 is adapted to rotate the head positioner assembly back and forth such that the heads move in unison across the information storage discs. A magnetic latch 70 holds the head positioner assembly in place when the disc drive is not in use.

Figure 3:
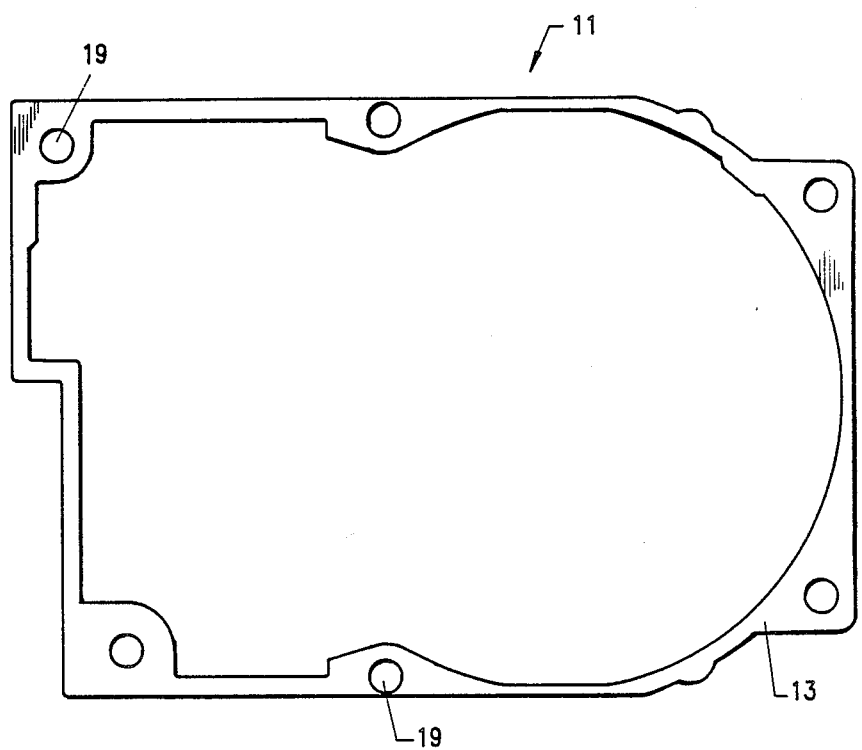
FIG. 3 is top view of a backbone gasket in accordance with the present invention.
Figure 4:
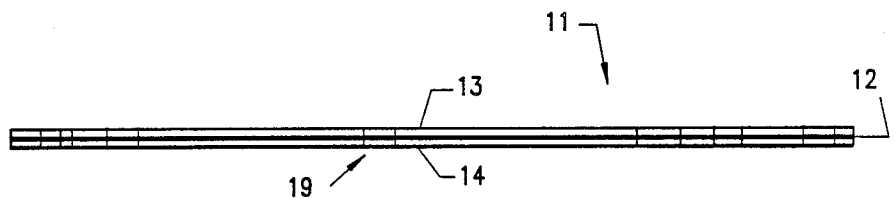
FIG. 4 is side view of the backbone gasket shown in FIG. 3.

Referring next to FIG. 3, a backbone gasket 11 is disposed between the top and bottom casing members to provide an air tight seal and to provide some damping for vibrations within the housing. The backbone gasket has a laminated construction that includes a stiffener layer 12 that is sandwiched by a pair of foam layers 13,14. The stiffener layer 12, which may be fabricated from a wide variety of materials, is preferably very thin and has a relatively low modulus of elasticity and good shearing properties. By way of example, a 10 mil thick sheet of VALOX manufactured by of works well.

The foam layers 13,14 may also be fabricated from a wide variety of materials including a wide variety of conventional plastic foams. A suitable thickness for each foam layer is approximately 62 mils. By way of example, EPDM foam manufactured by of works well.

Figure 5:
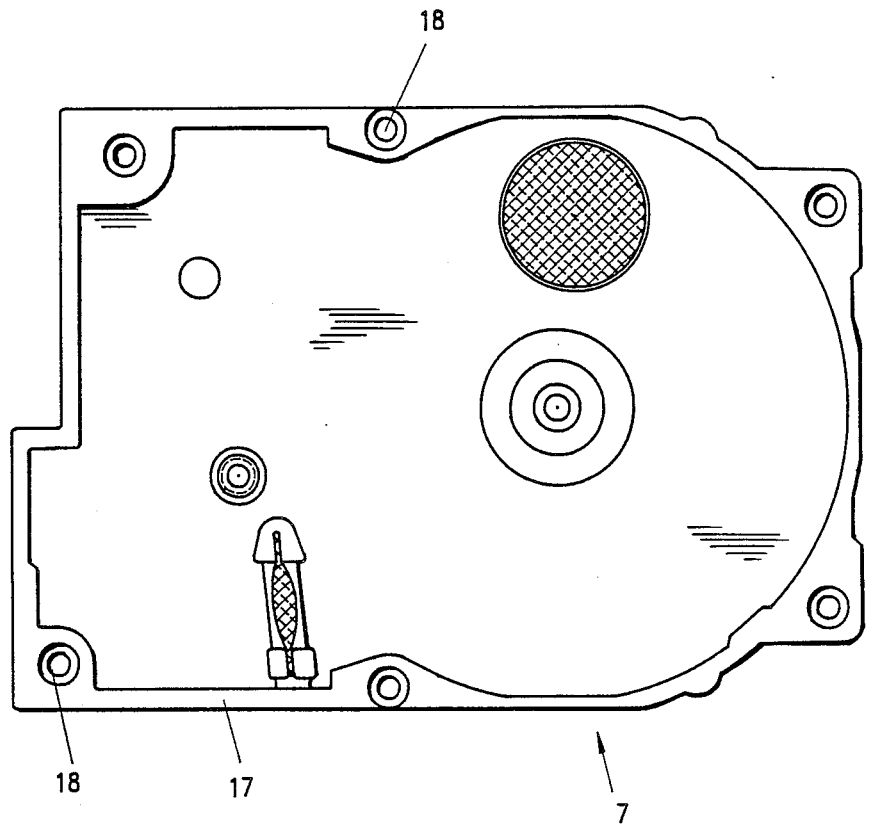
FIG. 5 is diagrammatic bottom view of the upper casing.

As can be best seen with reference to FIG. 1 the lower casing 9 has a flattened engaging surface 15 having a plurality of screwholes 16 therein. By way of example, in the embodiment shown in the figures, six screws are used to hold the upper and lower casings together. As can be seen in FIG. 5, the upper casing 7 has a matching engaging surface 17 that mirrors engaging surface 15 on lower casing 9. The upper casing 7 also has a plurality of screwholes 18 that are aligned with the screwholes 16 in lower engaging surface 15. The upper and lower casings may be fabricated from cast aluminum.

As can be seen in FIG. 3, the backbone gasket 11 takes the same shape as the engaging surfaces 15 and 17, and includes a plurality of screwholes 19 that are aligned with the screwholes 16 & 18 in the lower and upper casings 7,9 respectively. When the disc drive is assembled, the backbone gasket 11 is placed between the upper and lower casing engaging surfaces 15 and 17 respectively.

The described gasket construction has several advantages over prior art disc drive gaskets which tend to be fabricated from single, nonrigid elastomeric materials. A critical feature of the invention is that the stiffener layer provides enough rigidity of insure that the backbone gasket retains its shape even when held at one end. Of course, the gasket will droop somewhat when held by an end but it retains its original shape. It will be appreciated that nonrigid gaskets are somewhat difficult to align during production. Specifically, the gaskets must be placed onto the lower casing engaging surface 15 and aligned such that the screwholes 19 are properly positioned over the corresponding screwholes 16 in the lower casing 7. The backbone gasket 11 disclosed herein is much easier to assemble since it retains its shape even when held by one of its corners. Thus, the backbone gasket can easily be laid in place.

Another one of the drawbacks of prior art gaskets is that they tend to bulge outward when compressed. The sandwich construction for the backbone gasket divides the foam layer into two separate layers that are each about one half of the thickness of conventional elastomeric gaskets Although the plastic foam layers 13, 14 tend to squeeze outward somewhat when compressed, since each foam layer is much thinner then conventional gaskets and since the stiffener layer 12 is not elastomeric (and therefore will not stretch noticeably under compression), the backbone gasket will flow much less under compression than conventional gaskets. This has several advantages, including improved damping of vibrations and a better aesthetic appearance for the assembled disk drive.

A final advantage of the backbone gasket construction described above is that gasket is simple in terms of geometry and fabrication, making the present invention especially suitable for high volume production.

Although only a few embodiments of the present invention have been described herein, it should be understood that the present invention may be embodied in many other specific forms without departing from the spirit or scope of the invention. Particularly, it should be appreciated that the actual materials used to form the foam layers and the stiffener layer may be widely varied. Further, there may be more than one stiffener layers and/or there may be three or more foam layers. Additionally, the gasket may be used in conjunction with any disc drive arrangement. Therefore, the present examples and embodiments are to be considered as illustrative and not restrictive, and the invention is not to be limited to the details given herein, but may be modified within the scope of the appended claims.

I claim:

1. In a disc drive system having a recording media within a sealed housing having top and bottom casing members, a read/write head for transferring information between the recording media and an external system and a head positioner assembly for locating the head relative to the recording media, the improvement comprising a backbone gasket for sealing a connection between the top and bottom casing members, the backbone gasket including:
   a stiffener layer having opposing top and bottom sides; and
   a pair of elastomeric layers adhered to the top and bottom opposing sides of the stiffener layer respectively, thereby sandwiching the stiffening layer; and
   wherein the stiffener layer has a substantially lower modulus of elasticity than the elastomeric layers.

* * * * *